Sept. 27, 1966     A. W. ERICKSON     3,275,131

SHOCK ABSORBING SYSTEM FOR CONTAINERS

Filed April 2, 1965

INVENTOR.
ARTHUR W. ERICKSON
BY
Fryer Tjensvold Feix & Phillips
ATTORNEY

United States Patent Office 3,275,131
Patented Sept. 27, 1966

3,275,131
SHOCK ABSORBING SYSTEM FOR CONTAINERS
Arthur W. Erickson, 2510 De Koven Ave.,
Belmont, Calif.
Filed Apr. 2, 1965, Ser. No. 445,071
6 Claims. (Cl. 206—46)

The present invention relates to shock absorbing systems for use in containers and more particularly to a shock absorbing system suitable for loads of varying weights.

Extensive work has been undertaken in developing suitable shock absorbing systems for use in shipping delicate or easily-damaged instruments or similar articles. The advent of synthetic foamed materials has resulted in the development of highly efficient shock absorbing systems for use in packaging such devices. Such foam shock absorbing systems depend upon the placement of such foamed materials at various strategic positions within the container whereby any shock administered thereto is suitably absorbed before any damage occurs to the contents. The contents of such containers, however, are, generally speaking highly varied in their weights and therefore it has been necessary to custom design the foam shock absorbing system for each particular item to be packaged. This custom designing has further been necessitated by the fact that the best of the synthetic polymeric foamed materials, e.g., polyurethane, are relatively expensive. It is therefore advantageous, from an economic standpoint, to use no more foam material than is necessary in any one package.

It has been found that the best shock protection is obtained when the compression produced by the package contents on the foam shock absorbers reaches a value of approximately ten percent under static conditions. Thus a shock absorbing system wherein the contents produce a compression of less than ten percent or greater than ten percent is less efficient than one in which the compression is at approximately the quoted figure. Compression significantly less than ten percent permits transmission of proportionately higher percent of the initial shock to the item. Too light a loading also adversely affects the vibration dampening characteristics of foam.

Thus, it can be seen that in order to provide a shock absorbing system for any particular device, it is necessary to very closely design the amount of foam to give a result in the desired range. It is further more obvious that when the shipper or packager changes from one device of one weight to another of a different weight, it is desirable to change the amount and placement of the shock absorbing material on the system.

All of this necessitates the maintenance of a varied stock of shock absorbing systems each particularly tailored to a specific device. The maintenance of such an inventory or the production of tailored shock absorbing systems, of course, is quite expensive and troublesome.

The present invention alleviates all of the problems previously encountered with such foam shock absorbing systems by providing a standard shock absorbing system that can be easily modified by the insertion of modular units whereby a simple basic shock absorbing system can be easily altered to support package contents of greatly varying weights. Not only may the basic unit be easily altered to support package contents of varying weights, but in addition the system by suitable selection of modular units may be correctly matched to produce the best shock absorbing system for a particular weight of object. Further the fact that the system is simply varied to fit the weight of the object supported, results in the most economical use of he shock absorbing foams.

It is, therefore, an object of the present invention to provide a shock absorbing system that has a minimum member of standard basic units.

It is a further object of the invention to provide a shock absorbing system wherein modular units, all of identical dimension and shock absorbing ability, may be easily and simply added to the basic shock absorbing unit in order to furnish a shock absorbing unit suitable for objects of greatly varying weights.

It is another object of the invention to provide a shock absorbing system suitable for objects of greatly varying weights wherein the stock of shock absorbing units is greatly simplified and minimized.

Further objects and advantages of the invention will become apparent from the following specification taken in conjunction with the drawings of which:

Figure 2:
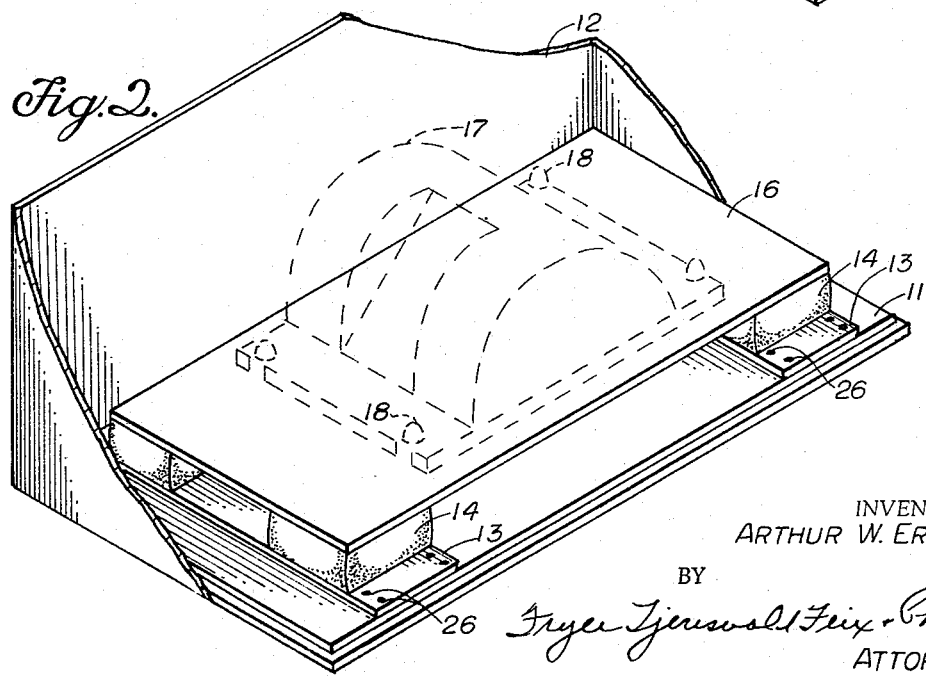
FIG. 2 is a perspective view of the shock absorbing system of the invention in use in a container (cut away) wherein the object within the container is shown in phantom view.

With reference to the drawing it will be seen that the shock absorbing unit 10 of the invention comprises a base plate 11 which most usually is of a rectangular configuration of dimensions suitable to fit shock absorbing unit 10 into the bottom of a container 12, such as that partially shown in FIG. 2. Base plate 11 is made of any suitable material, most usually however, plywood, of a thickness sturdy enough to support the object to be carried within the container 12 without undue deflection thereof. Container 12 may be any suitable boxing material, most usually corrugated paperboard or, if suitable, wooden packaging material.

Overlying base plate 11 are stringers 13 to which in turn are adhered blocks of a suitable resilient foam material 14. Foam blocks 14 in turn support upper plate 16 which forms the upper surface of the entire shock absorbing unit. Upper plate 16 has a length and width somewhat less than that of base plate 11 and is centered thereover by blocks 14. Blocks 14 completely underlie upper plate 16 while stringers 13 extend out to the edge of base plate 11. Thus the extending portions of stringers 13 may be utilized as nailing positions to align the stringers 13 and blocks 14 as well as upper plate 16 with base plate 11. Generally speaking, foam blocks 14 are placed in each of the four corners of upper plate 16. However, in certain instances where the shock absorbing unit is rather long with respect to its width, additional foam blocks 14 on additional stringers 13 are placed intermediate end stringers 13 and accompanying foam blocks 14. However, for purposes of this disclosure, such intermediate stringers 13 and foam blocks 14 are omitted from the drawing.

Stringers 13 and upper plate 16 are made of a suitable material, most usually plywood, and are of a thickness to remain rigid under the load of the object to be carried in box 12. Generally speaking, upper plate 16 is of a thickness equal to bottom plate 11, while stringers 13 are usually somewhat thinner. Stringers 13 are glued in position on base plate 11, and most generally are further secured thereto by means of small nails 26. Foam blocks 14 are adhered to stringers 13 and to the bottom of upper plate 16 by any suitable high strength glue or adhesive material. Such glues or adhesives are well known in the art, and it is only necessary that they form a strong bond between the foam blocks 14, stringers 13, and the under surface of upper plate 16.

Foam blocks 14 may be formed of any suitable resilient foamed material. Foam produced from polyurethane is the preferred material for use in the shock absorbing system of the present invention, since it has been found that it has the most desirable cushioning curve of foam materials presently available on the market.

Various foam materials exhibit different characteristics with respect to the absorption of shock and compression. It has been found that polyurethane foams exhibit desired properties of an increasing resistance to compression as the foam material is compressed more and more, whereby a shock transmitted thereto is gradually absorbed by the material and the deceleration of any object supported thereby is gradually brought to zero and jolts or shocks are suitably absorbed. It should be understood, of course, that other resilient foam materials may be entirely suitable for use in the shock absorbing units of the invention, depending upon the sensitivity of the object to be carried in the container 12. Thus, for instance, foamed polyethylene and foam rubber may also be used for foam blocks 14. Under other conditions other known foamed materials may also be utilized.

The object to be carried in container 12 is suitably secured to the upper surface of upper plate 16. For instance an object 17 is shown in phantom view in FIG. 2 secured to upper plate 16 as by bolts 18. It is only necessary that object 17 be secured to upper plate 16 in some manner whereby it will not shift in relation to upper plate 16 under the influence of shocks administered to container 12.

As previously discussed, it is known in the art that a ten percent compression of the shock absorbing system is optimum for the best shock protection of the object to be carried in the container. Thus, given any suitable size of corner blocks 14, and given a particular compressibility thereof, it will be understood that an object of a particular weight will, when placed on surface of upper plate 16, compress the blocks 14 to the optimum ten percent figure. It will also be readily understood that should a heavier object be placed on upper plate 16, the same blocks 14 may be very well compressed far beyond the ten percent optimum figure. If it is desired to carry a heavier object 17 within box 12 than that which would provide a suitable ten percent compression of blocks 14, then additional modules 19 are added to the shock absorbing unit.

Figure 1:
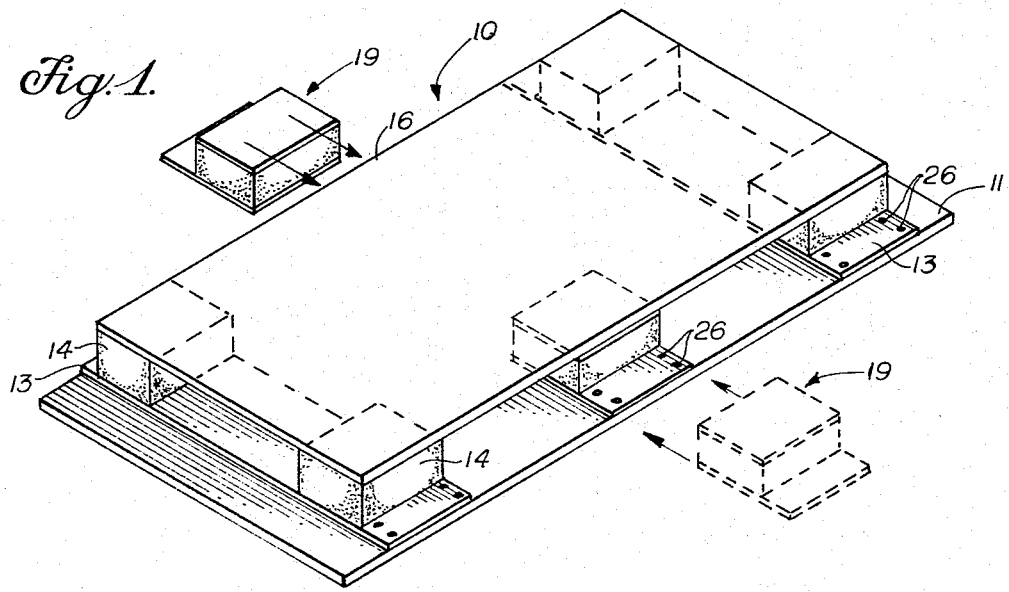
FIG. 1 is a perspective view of the shock absorbing system of the invention.
Figure 3:
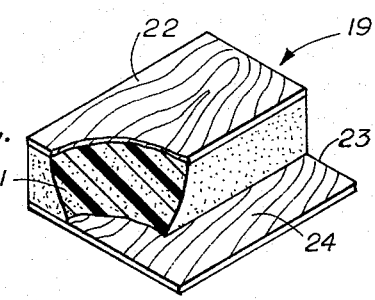
FIG. 3 is a perspective view of a shock absorbing module of the invention with a portion cut away.

Such shock absorbing modules 19 are illustrated in FIG. 3 of the drawing wherein a block 21 of resilient foam material is secured between upper and lower bearing plates 22 and 23 respectively. Upper and lower bearing plates 22 and 23 are any suitable material such as plywood. Foam block 21 is permanently secured thereto by any suitable adhesive material. Further, block 21 is made of the identical resilient foam material as that of blocks 14. In addition, block 21 is of the identical thickness as blocks 14, while upper bearing plate 22 and lower bearing plate 23 are of a thickness exactly half that of stringers 13. It will also be seen that lower bearing plate 23 has an extension 24 which projects beyond one edge of block 21.

As stated above, resilient foam block 21 is made in the same thickness as foam blocks 14. In addition upper and lower bearing plates 22 and 23 are of a thickness of one-half the thickness of stringers 13. It will be seen that when the total thickness is calculated from the thickness of upper and lower bearing plates 22 and 23 along with that of block 21, the thickness of module 19 will add up to a figure just equal to the total thickness of blocks 14 and stringers 13. Thus, module 19 is insertable between base plate 11 and upper plate 16 at any point intermediate blocks 14 and stringers 13.

The addition of module 19 to shock absorbing unit 10 increases the total load bearing capacity thereof in direct relation to the number of modules 19 inserted therein. Further, knowing the properties of the resilient foam material used as the shock absorbing material in the system enables the packager to insert the exact number of additional modules 19 into unit 10 in order to most efficiently support any desired weight thereon.

As an illustration, commercially available polyurethane foam having a density of 3.8 pounds per cubic foot, has been found to have an optimum loading factor of about .4 to .5 pound per square inch. This means that when such a density of polyurethane foam is loaded to approximately one-half pound per square inch, it will be compressed to the ideal ten percent figure discussed above.

Utilizing such figures, a simple calculation will show that in order to support a basic 300 pound object on shock absorbing unit 10, it is necessary to provide four corner resilient foam blocks 14 having length and width dimensions of 15 inches by 10 inches each. For most purposes, a block of 2 inches in thickness has been found to be most useful for packaging such objects. The 2 inch thickness permits the ten percent static compression and leaves sufficient thickness of foam to fully absorb the travel induced by any expected jars or shocks to the package.

A block 15 inches by 10 inches comprises an area of 150 square inches. Assuming the optimum loading figure of about one-half pound per square inch, then such a block will be suitable for supporting a weight of 75 pounds. Since it is assumed that there are four blocks, one at each corner of upper plate 16, the total weight that such a unit will most suitably support is 300 pounds.

It will also be readily apparent that should it be desired to package an object of a weight greater than 300 pounds on such a shock absorbing unit as just described, it will only be necessary to insert a suitable number of modules 19 between upper plate 16 and lower plate 11 of unit 10. For instance, if resilient foam blocks 21 of module 19 were cut to a size of 10 inches by 10 inches by 2 inches, a simple calculation will show that the surface of such module would be 100 square inches. Once again utilizing the optimum loading factor of approximately one-half pound per square inch, it will be seen that each module 19 added to unit 10 will accommodate 50 pounds additional weight in the object to be carried.

Utilizing the unit figures set forth above, if it is desired to package a 400 pound object rather than a 300 pound object, it is only necessary to insert two modules 19 of a surface area 10 inches by 10 inches between upper plate 16 and lower plate 11 of unit 10. In like manner, objects of even greater weight may be accommodated by shock absorbing unit 10 through the insertion of additional module units 19.

It will also be apparent that by changing the length and width dimensions of module 19, the weight supporting ability of each unit can be varied to suit any desired figure.

After insertion of the desired number of modules 19 into unit 10, they may be secured therein by suitable means such as by nails 26.

It should be understood that the actual figures presented above are those for a 3.8 pound per cubic foot polyurethane foam material. More dense or less dense polyurethane materials will obviously have a different optimum loading factor and, further, resilient foams of other materials will also have different loading factors. However, such optimum loading factors are readily secured from the suppliers of such resilient foam material.

Utilizing the shock absorbing system of the present invention, objects of greatly varying weight may be packaged with a shock absorbing system essentially "custom designed" to that particular object. In addition, such objects are packaged with a shock absorbing unit that is ideally suited to cushion the weight of that particular object as well as providing a unit wherein foam material is utilized in the most economic manner.

What is claimed is:

1. A method for protecting a packaged object from jars and shocks comprising securing said object to a base plate that is cushioned by a fixed number of resilient foam blocks, and increasing the supporting ability of said base plate and resilient blocks to accommodate the weight of said object by adding resilient foam modules beneath said base plate.

2. A method for protecting a packaged object from jars and shocks comprising supporting said object on a base including a plurality of fixed resilient foam blocks and increasing the support of said base by adding resilient foam modules therebeneath.

3. A shock absorbing unit comprising a first upper support plate of length and width dimensions suitable to accommodate an object to be supported thereon and to be protected from jars and shocks, a second lower support plate underlying said first upper plate and spaced apart therefrom, resilient blocks of foam material fixedly disposed between said upper and lower plates and serving to space them apart, at least one resilient foam module of a thickness equal to that of said fixed resilient blocks inserted between said upper and lower support plates to increase the shock absorbing capacity of said unit.

4. The module of claim 3 wherein the resilient foam is sandwiched between upper and lower rigid members and wherein the total thickness of said module is equal to the distance between said upper and lower plates of said shock absorbing unit whereby said module is insertable between said plates.

5. The shock absorbing unit of claim 3 wherein said resilient foam blocks and the resilient foam of said module are polyurethane foam.

6. A package suitable for objects which are to be protected from jars and shocks, comprising a box, a shock absorbing unit resting on the bottom of said box, said shock absorbing unit comprising a lower base plate, resilient foam blocks secured to the upper surface of said base plate, an upper plate secured to and overlying said resilient foam blocks, and a plurality of insertable resilient foam modules which are insertable between said upper and lower base plates to increase the load carrying and shock absorbing capacity of said unit.

References Cited by the Examiner

UNITED STATES PATENTS

| | | | |
|---|---|---|---|
| 208,820 | 10/1878 | Hubbell | 248—350 |
| 1,440,498 | 1/1923 | Shurtleff | 248—22 |
| 1,795,613 | 3/1931 | Moehle | 229—14 |
| 2,554,657 | 5/1951 | Betterton et al. | 248—350 |
| 2,611,569 | 9/1952 | Coleman et al. | |
| 2,904,329 | 9/1959 | Joseph | 267—33 |

THERON E. CONDON, *Primary Examiner.*

W. T. DIXSON, *Assistant Examiner.*